Reissued June 5, 1934 Re. 19,194

UNITED STATES PATENT OFFICE 19,194

PRODUCTION OF ORGANIC PRODUCTS FROM 7.18-STEARIC GLYCOL

Fritz Guenther and Karl Saftien, Ludwigshafen-on-the-Rhine, Germany, assignors to I. G. Farbenindustrie Aktiengesellschaft, Frankfort-on-the-Main, Germany No Drawing. Original No. 1,942,812, dated January 9, 1934, Serial No. 604,863, April 12, 1932. Application for reissue April 12, 1934, Serial No. 720,494. In Germany April 29, 1931

9 Claims. (Cl. 260—99.12)

The present invention relates to the production of new organic products.

We have found that a new organic material which can be converted into valuable assistants for the textile and allied industries, in particular wetting, cleansing, dispersing and like agents, can be obtained by splitting off one molecular proportion of water from the 7.18-stearic glycol obtainable by the reduction of ricinoleic acid or its esters, the resulting unsaturated alcohol being then converted into water soluble products by treatment with a strong polybasic mineral acid substance selected from the group consisting of sulphonating agents and phosphoric acid or its derivatives.

The splitting off of water very probably takes place at the secondary hydroxyl group and a product isomeric with natural oleyl alcohol $$(CH_3-(CH_2)_7-CH=CH-(CH_2)_7-CH_2OH=$$
$$9.10\text{-octo-decene-18-ol})$$

is obtained which differs from the latter in the position of the double linkage.

The advantage of the process according to the present invention contrasted with that described in the British Patents Nos. 308,824 and 317,039 consists in the fact that the oleyl alcohol used as initial material in the said specifications only occurs in nature in limited quantities or can only be obtained in a troublesome manner by reducing alkyl esters of oleic acid with the aid of sodium, whereas the conversion of 7.18-stearic glycol into an unsaturated alcohol may be effected very readily and furthermore the preparation of 7.18-stearic glycol by the catalytic hydrogenation of castor oil (which is available in unlimited amounts) offers no difficulty, such process being described for example in the British Patent No. 356,731.

The conversion of 7.18-stearic glycol into an unsaturated alcohol may be effected by heating for some hours to temperatures of from about 50° to about 200° C. with an addition of strong non-oxidizing acids. Organic sulphonic acids, such as naphthalene sulphonic acids, and also highly concentrated aqueous solutions of strong inorganic polybasic acids, as for example about 90 per cent aqueous phosphoric or sulphuric acids, are particularly suitable for the said purpose but also chloracetic acid may be employed. The said sulphonic acids may be employed in quantities of from about 0.5 to about 5 per cent, or more, by weight of the glycol, whereas the mineral acids, chloracetic and like acids are usually employed in about equimolecular proportions or, preferably, higher quantities such as from 1.2 to 10 molecular proportions.

The splitting off of water proceeds especially smoothly when first of all the monochloracetate is formed by heating the 7.18-stearic glycol with an equimolecular proportion of monochloracetic acid to from 180° to 200° C. If a little more than 1 molecular proportion of monochloracetic acid be used for each molecular proportion of stearic glycol for the esterification, or if a further amount of monochloracetic acid be added after the esterification has been carried out with 1 molecular proportion of monochloracetic acid, and the whole be heated for some hours at about 200° C., the said splitting off of water takes place smoothly and the chloracetate of an unsaturated alcohol is obtained from which the alcohol itself may be obtained by saponification.

In order to convert the resulting unsaturated alcohol, which is apparently an octodecene-18-ol in which the double linkage is connected to the seventh carbon atom of the chain, into water-soluble products it is treated with an at least equimolecular proportion of a strong polybasic mineral acid substance selected from the group consisting of sulphonating agents and phosphoric acid or its derivatives such as sulphuric acid, oleum, amidosulphonic acid ($NH_2—SO_3H$), sulphur trioxide or chlorsulphonic acid, or with phosphoric acid or its acid reacting derivatives such as phosphorus pentoxide and phosphorus oxychloride, if desired with an addition of agents capable of combining with water such as acetic anhydride. When oleum, sulphur trioxide or chlorsulphonic acid are employed it is preferable to work in the presence of inert, organic liquid diluents, such as carbon tetrachloride, trichlorethylene, ethyl ether, glacial acetic acid or like inert organic solvents, since otherwise dark colored products may be readily formed. Thus, for example, the alcohol may be treated for about 1 hour at a temperature of from about 0° to 50° C. with its own weight of sulphuric acid of 96 per cent strength, or the alcohol may also be dissolved in an inert solvent, such as ethyl ether or carbon tetrachloride, and treated at about 20° C. for about 30 to 60 minutes with an equimolecular proportion of chlorosulphonic acid. The esters obtainable in this manner correspond presumably to the formula $$CH_3—(CH_2)_4—R—(CH_2)_9—CH_2OX$$

in which R denotes $$[—CH=CH—CH_2—]$$

X denotes hydrogen, $$—OSO_3Y \text{ or } —O—PO(OY)_2$$

Y being hydrogen or an alkali radicle or, in the case of a diester, for example to the formula $$CH_3—(CH_2)_4—R—(CH_2)_9—CH_2OSO_3Y$$

in which R denotes $$[CHZ—CHZ—CHZ]$$

in which one of the Z's denotes $—O—SO_3Y$, the remaining Z's denote hydrogen and Y denotes hydrogen or an alkali metal radicle which latter can be obtained by the employment of a mixture of chlorsulphonic and sulphuric acids, or as a mixture containing preponderating quantities of such di-ester. The unsaturated alcohol may also be dissolved in about its own weight of acetic anhydride and at least one equimolecular proportion of sulphuric acid of 100 per cent strength may be added, the mixture being kept at a temperature of from about 10° to 20° C. for about 8 hours; in this case, after saponification of acetyl groups, a sulphonic acid may be formed which presumably corresponds to the formula $$CH_3—(CH_2)_4—[CHZ—CHZ—CHZ]—(CH_2)_9—CH_2OH$$

in which vicinal Z's denote $—SO_3H$ and $—OH$ and the remaining Z denotes hydrogen.

The compounds obtained in the said manner may be employed either as such or in the form of their alkali salts, such as sodium, potassium or ammonium salts, for a great variety of purposes in domestic and industrial use by reason of their excellent wetting, cleansing and emulsifying power. In particular they are capable of wide employment in the textile industries, as for example as wetting, washing, levelling and like agents or for softening artificial silk. They may be employed alone or together with a great variety of additions, such as salts, as for example common salt, Glauber's salt or sodium perborate, acids, such as aqueous dilute solutions of organic or mineral acids, alkalies, glue, water-soluble or water-insoluble solvents, oils of mineral, vegetable or animal origin, soaps and like agents used in the textile and related industries.

The following examples will further illustrate the nature of this invention but the invention is not restricted to these examples. The parts are by weight.

*Example 1*

286 parts of 7.18-stearic glycol (obtainable by the catalytic reduction of castor oil according to the British Patent No. 356,731) are heated, while leading in a current of nitrogen into the mixture, with 125 parts of chloracetic acid for 5 hours at from 180° to 200° C., whereby about 36 parts of water are split off. The chloracetate obtained is saponified by boiling for several hours with 1500 parts of an aqueous caustic soda solution of 10 per cent strength. In order to purify the product which separates out as an oily layer on the top of the aqueous liquid, it may be distilled at from 150° to 210° C. at a pressure of 2 millimeters mercury gauge.

50 parts of the unsaturated alcohol (octodecenol, in which the double linkage is presumably on either side of the seventh carbon atom) thus obtained are dissolved in 150 parts of ethyl ether and a mixture of 23 parts of chlorsulphonic acid and 50 parts of ethyl ether is added while cooling to about 15° C. After stirring for one hour the reaction product is poured onto ice, neutralized with an aqueous caustic soda solution and the ethyl ether is evaporated. In this manner a product having excellent washing and wetting power is obtained, which, besides some common salt contains the sulphuric ester sodium salt corresponding presumably to the formula $$CH_3—(CH_2)_4—[CH=CH—CH_2]—(CH_2)_9—CH_2—O—SO_3Na.$$

*Example 2*

74 parts of 7.18-stearic glycol di-acetate are heated together with 10 parts of chloracetic acid for 2 hours at 200° C. while passing through a current of nitrogen, whereupon the whole is heated to 250° C. for 2 hours and then to boiling for the same length of time with 500 parts of a 10 per cent ethyl-alcoholic caustic potash solution the alcohol being then distilled off. By adding water, the unsaturated alcohol formed is precipitated. If desired, the latter may be purified by distillation at a pressure below atmospheric pressure.

The conversion of the unsaturated alcohol into a water-soluble product is carried out with chlorsulphonic acid and ethyl ether as described in Example 1.

*Example 3*

27 parts of the alcohol obtained by acting with chloracetic acid on 7.18-stearic glycol and subsequent saponification as described in Example 1 are dissolved in 200 parts of ethyl ether and then intimately stirred with 15 parts of phosphoric pentoxide for 24 hours. The reaction product is poured onto ice and the resulting solution is neutralized with aqueous caustic soda solution. The supernatant ethereal layer is separated from the aqueous layer and washed with water. The aqueous solutions are then inspissated whereby a product having a good emulsifying power is obtained. The phosphoric ester presumably corresponds to the formula $$CH_3—(CH_2)_4—[CH=CH—CH_2]—(CH_2)_9—CH_2—O—\overset{\overset{\displaystyle O}{\|}}{P}(OH)_2$$

and may be employed in the form of its mono- or di-sodium salts.

*Example 4*

20 parts of chlorsulphonic acid and 20 parts of concentrated sulphuric acid are added while cooling to a mixture of 25 parts of trichlorethylene and 45 parts of an unsaturated alcohol obtained, according to Example 1 by the action of chloracetic acid on 7.18-stearic glycol. After stirring for 2 hours the reaction mixture is poured onto ice, rendered neutral with the aid of aqueous caustic soda solution and then evaporated to dryness. A product is obtained which, besides sodium chloride and sodium sulphate, consists of a mixture of sulphuric acid salts of the said alcohol, a preponderating quantity of which salts corresponds to the formula $$CH_3—(CH_2)_4—[CHZ—CHZ—CHZ]—(CH_2)_9—CH_2OSO_3Na,$$

in which one of the Z's denotes (—$OSO_3Na$) and the remaining two Z's denote hydrogen.

What we claim is:

1. The process for the production of organic products which comprises splitting off one molecular proportion of water from 7.18-stearic glycol by heating the latter to from about 100° C. to about 200° C. in the presence of a strong non-oxidizing acid selected from the group consisting of phosphoric acid, sulphuric acid, organic sulphonic acids and halogen acetic acids.

2. The process for the production of organic products which comprises splitting off one molecular proportion of water from 7.18-stearic glycol by heating the monochloracetate of 7.18-stearic glycol to about 200° C. in the presence of a strong non-oxidizing acid selected from the group consisting of phosphoric acid, sulphuric acid, organic sulphonic acids and halogen acetic acids and saponifying the resulting unsaturated ester.

3. The process for the production of organic products which comprises splitting off one molecular proportion of water from 7.18-stearic glycol and reacting the resulting unsaturated primary alcohol with an at least equimolecular proportion of a strong polybasic mineral acid substance selected from the group consisting of sulphonating agents and phosphoric acid, its anhydrides and oxyhalides.

4. The process for the production of organic products which comprises splitting off one molecular proportion of water from 7.18-stearic glycol and reacting the resulting unsaturated primary alcohol with an at least equimolecular proportion of chlorsulphonic acid in the presence of an inert, organic liquid solvent.

5. The process for the production of organic products which comprises splitting off one molecular proportion of water from 7.18-stearic glycol and reacting the resulting unsaturated primary alcohol with an about equimolecular quantity of chlorsulphonic acid in the presence of ethyl ether at about 15° C.

6. The process for the production of organic products which comprises splitting off one molecular proportion of water from 7.18-stearic glycol and reacting the resulting unsaturated primary alcohol with an at least equimolecular proportion of phosphorus pentoxide.

7. Unsaturated alcohol substances presumably corresponding to the formula $$CH_3—(CH_2)_4—R—(CH_2)_9—CH_2OX$$

in which R denotes $$[—CH=CH—CH_2—],$$

X denotes hydrogen, —$OSO_3Y$ or —O—$PO(OY)_2$, Y being hydrogen or an alkali metal radicle.

8. An acid sulphuric ester substance corresponding to the formula $$CH_3—(CH_2)_4—R—(CH_2)_9—CH_2OSO_3Y,$$

in which R denotes $$[—CH=CH—CH_2—]$$

and Y denotes hydrogen or an alkali metal radicle.

9. An acid sulphuric ester substance corresponding to the formula $$CH_3—(CH_2)_4—R—(CH_2)_9—CH_2OSO_3Y,$$

in which R denotes $$[CHZ—CHZ—CHZ]$$

in which one of the Z's denotes —O—$SO_3Y$, the remaining Z's denote hydrogen and Y denotes hydrogen or an alkali metal radicle.

FRITZ GUENTHER.
KARL SAFTIEN.